(12) United States Patent
Matsushita et al.

(10) Patent No.: US 9,089,924 B2
(45) Date of Patent: Jul. 28, 2015

(54) INDIRECT SPOT WELDING METHOD

(75) Inventors: Muneo Matsushita, Chiba (JP); Rinsei Ikeda, Chiyoda-ku (JP)

(73) Assignee: JFE Steel Corporation, Tokyo (JP)

( * ) Notice: Subject to any disclaimer, the term of this patent is extended or adjusted under 35 U.S.C. 154(b) by 796 days.

(21) Appl. No.: 13/144,555

(22) PCT Filed: Jan. 28, 2010

(86) PCT No.: PCT/JP2010/051549
§ 371 (c)(1),
(2), (4) Date: Jul. 14, 2011

(87) PCT Pub. No.: WO2010/087508
PCT Pub. Date: Aug. 5, 2010

(65) Prior Publication Data
US 2011/0272384 A1 Nov. 10, 2011

(30) Foreign Application Priority Data

Jan. 29, 2009 (JP) ................................ 2009-018809
Oct. 22, 2009 (JP) ................................ 2009-243650

(51) Int. Cl.
B23K 9/10 (2006.01)
B23K 11/11 (2006.01)
B23K 11/24 (2006.01)
B23K 11/31 (2006.01)

(52) U.S. Cl.
CPC ............... *B23K 11/115* (2013.01); *B23K 11/24* (2013.01); *B23K 11/312* (2013.01); *B23K 2201/04* (2013.01); *B23K 2201/18* (2013.01)

(58) Field of Classification Search
USPC ................... 219/91.1, 91.22, 92, 78.01, 110
See application file for complete search history.

(56) References Cited

U.S. PATENT DOCUMENTS

| 5,194,709 A * | 3/1993 | Ichikawa et al. ............... 219/109 |
| 5,484,975 A * | 1/1996 | Itatsu ............................. 219/86.7 |
| 5,906,755 A * | 5/1999 | Arasuna et al. ............. 219/86.41 |
| 7,060,929 B2 * | 6/2006 | Sun et al. ..................... 219/86.7 |
| 2004/0007562 A1 * | 1/2004 | Kitahori et al. ............ 219/86.41 |
| 2005/0184031 A1 * | 8/2005 | Sun et al. .................. 219/117.1 |
| 2007/0131655 A1 * | 6/2007 | Spinella et al. ............. 219/61.4 |

(Continued)

FOREIGN PATENT DOCUMENTS

| JP | 5248536 | 4/1977 |
| JP | 57121884 | 7/1982 |
| JP | 02-274384 | 11/1990 |

(Continued)

OTHER PUBLICATIONS

International Search Report for PCT/JP2010/051549 dated Mar. 9, 2010.

*Primary Examiner* — Dana Ross
*Assistant Examiner* — Ayub Maye
(74) *Attorney, Agent, or Firm* — RatnerPrestia

(57) ABSTRACT

An indirect spot welding method is provided in which, in indirect spot welding, nuggets formed in a fused state can be stably obtained. In the indirect spot welding method, the welding time is divided into two time periods $t_1$ and $t_2$, where electrode force $F_1$ and current $C_1$ are applied in the first time period $t_1$, and electrode force $F_2$ lower than electrode force $F_1$ and current $C_2$ higher than current $C_1$ are applied in the next time period $t_2$.

6 Claims, 3 Drawing Sheets (a)

(b)

(56) References Cited

U.S. PATENT DOCUMENTS

| | | | |
|---|---|---|---|
| 2008/0302774 A1* | 12/2008 | Meulenberg | 219/137 R |
| 2009/0084763 A1* | 4/2009 | Spinella et al. | 219/86.41 |

FOREIGN PATENT DOCUMENTS

| | | | | |
|---|---|---|---|---|
| JP | 08-118036 | 5/1996 | | |
| JP | 11-333569 | 12/1999 | | |
| JP | 11333569 | 12/1999 | | |
| JP | 2001170774 | 6/2001 | | |
| JP | 2001170774 A | * 6/2001 | ............ | B23K 11/11 |
| JP | 2002239742 | 8/2002 | | |
| JP | 2006-198676 | 8/2006 | | |
| JP | 2006198676 | 8/2006 | | |
| JP | 2008093707 | 4/2008 | | |

\* cited by examiner (a) (Prior Art)

INDIRECT SPOT WELDING METHOD

CROSS-REFERENCE TO RELATED APPLICATIONS

This application is the U.S. National Phase application of PCT International Application No. PCT/JP2010/051549, filed Jan. 28, 2010, and claims priority of Japanese Patent Application No. 2009-018809, filed Jan. 29, 2009, and Japanese Patent Application No. 2009-243650, filed Oct. 22, 2009, the disclosures of which PCT and priority applications are incorporated herein by reference in their entirety for all purposes.

FIELD OF THE INVENTION

The present invention relates to an indirect spot welding method in which a member composed of at least two overlapping metal sheets is welded by holding a spot welding electrode against the metal sheets while applying pressure to the spot welding electrode from one side of the member, attaching a feeding point to the metal sheet on the other side of the member at a location remote from the spot welding electrode, and allowing current to flow between the spot welding electrode and the feeding point.

BACKGROUND OF THE INVENTION

In welding automobile bodies and automobile components, resistance spot welding, typically direct spot welding, has been conventionally used. Recently, for example, a series spot welding method and an indirect spot welding method have been used.

Characteristics of these three types of spot welding will be described with reference to FIG. 1.

All the three types of spot welding are the same in that at least two overlapping steel sheets are joined together by welding.

FIG. 1(a) illustrates a direct spot welding method. As illustrated, the direct spot welding is a method in which a point-like welded portion 5 is obtained, through use of resistance heat generated between two overlapping metal sheets 1 and 2, by allowing current to flow through the metal sheets 1 and 2 while applying pressure to a pair of electrodes 3 and 4 sandwiching the respective metal sheets 1 and 2 from above and below. The electrode 3 is provided with a force controlling system 6 and a current controller 8, and the electrode 4 is provided with a force controlling system 7 and the current controller 8. This mechanism makes it possible to control welding force and current.

A series spot welding method illustrated in FIG. 1(b) is a method in which point-like welded portions 15-1 and 15-2 are obtained by allowing current to flow through two overlapping metal sheets 11 and 12 while applying pressure to a pair of electrodes 13 and 14 at separate locations from the same side (in the same direction).

An indirect spot welding method illustrated in FIG. 1(c) is a method in which a point-like welded portion 25 is formed between two overlapping metal sheets 21 and 22 by holding an electrode 23 against the metal sheet 21 while applying pressure to the electrode 23, attaching a feeding point 24 to the other metal sheet 22 at a location remote from the electrode 23, and allowing current to flow between the electrode 23 and the feeding point 24.

Of the three welding methods described above, the direct spot welding method is used when there is enough room and it is possible to create an opening which allows the metal sheets to be sandwiched from above and below.

In actual welding, however, it is often difficult to make enough room and to sandwich the metal sheets from above and below in a closed cross-sectional structure. The series spot welding method or the indirect spot welding method is used in such cases.

However, when the series spot welding method or the indirect spot welding method is used in applications such as those described above, the overlapping metal sheets are pressed by an electrode from only one side, with the other side of the metal sheets being unsupported and hollow. Therefore, unlike in the case of the direct spot welding method where the metal sheets are sandwiched by electrodes on both sides, it is not possible to apply high welding force locally to a point directly below the electrode. Moreover, since the electrode sinks into the metal sheet in contact therewith during application of current, conditions of contact between the electrode and the metal sheet and between the metal sheets change. This results in an unstable current path between the overlapping metal sheets, and makes it difficult to form a fused junction.

As a solution to the problems described above, Patent Literature (PTL) 1 discloses a series spot welding method in which "to form nuggets at points of contact between overlapping metal sheets, steady-state current is applied after forming electrode nuggets by application of large current at an early stage of welding process". PTL 2 discloses another series spot welding method in which "sufficient welding strength can be obtained, without use of back electrodes, by forming seats one step higher than other portions, and pressing electrodes into contact with the respective seats such that the seats are compressed".

As for indirect spot welding, PTL 3 discloses a welding method which is also applicable to series spot welding. Specifically, PTL 3 discloses a welding method in which "during application of current in series spot welding or indirect spot welding, a time period during which current is kept high and a time period during which current is kept low are repeated alternately". PTL 3 also discloses a welding method in which "during alternate repetition of a time period during which current is kept high and a time period during which current is kept low, the level of current in time periods during which current is kept high is gradually increased".

Patent Literature

PTL 1: Japanese Unexamined Patent Application Publication No. 11-333569
PTL 2: Japanese Unexamined Patent Application Publication No. 2002-239742
PTL 3: Japanese Unexamined Patent Application Publication No. 2006-198676

SUMMARY OF THE INVENTION

The technique disclosed in PTL 1 may be effective for series spot welding, but may not be effective for indirect spot welding which involves a different welding method.

The technique disclosed in PTL 2 may also be effective for series spot welding, but may not necessarily be effective for indirect spot welding. Additionally, this technique is disadvantageous in that it requires an additional process in which seats one step higher than other portions are formed by a press or the like at positions where electrodes are brought into contact therewith.

PTL 3 gives a description of overlapping portions between the metal sheets 11 and 12 welded in accordance with a welding pattern based on the technique disclosed in this document. The description is as follows: "observation of metallographic structures of overlapping portions between the metal sheets 11 and 12 reveals that there are events where, as compared to the cases of conventional typical nuggets, the metal of the overlapping portions between the metal sheets 11 and 12 is finer and there are many overlapping portions in which the metal is partially fused and recrystallized. This is the case where the metal sheets 11 and 12 are joined together by so-called diffusion bonding. The metal sheets 11 and 12 may be joined together by events different from those in the cases of conventional typical nuggets" (see paragraph [0038] in PTL 3). This means that unlike in the cases of nuggets seen in direct spot welding, nuggets obtained in accordance with the technique disclosed in PTL 3 are not necessarily formed in a biconvex shape in a completely fused state.

Control standards for spot-welded parts currently used by transport equipment manufacturers often require that spot-welded parts be nuggets formed after being completely fused, such as those obtained in direct spot welding. Therefore, even if sufficient bonding strength can be achieved, the control standards are not met unless nuggets formed in a completely fused state can be obtained.

The present invention has been developed in view of the current circumstances described above. The present invention provides an indirect spot welding method in which, in indirect spot welding which involves applying pressure to overlapping metal sheets with an electrode from only one side while leaving the other side unsupported and hollow, nuggets formed in a fused state can be stably obtained.

After intensive studies to solve the problems described above, the present inventors have obtained the following findings:

(a) In indirect spot welding which involves applying pressure to overlapping metal sheets with an electrode from only one side while leaving the other side unsupported and hollow, it is not possible to apply high welding force locally to a point directly below the electrode, unlike in the case of a direct spot welding method where metal sheets are sandwiched by electrodes on both sides. Therefore, a high current density cannot be achieved between the overlapping metal sheets directly below the electrode. Additionally, since the electrode sinks into the steel sheet in contact therewith during application of current, the areas of contact between the electrode and the metal sheet and between the metal sheets increase. As a result, the current densities between the electrode and the metal sheet and between the metal sheets decrease. Therefore, in indirect spot welding, unlike in the case of direct spot welding, it is difficult to generate heat sufficient for forming a fused portion between the overlapping metal sheets directly below the electrode, and difficult to form a fused junction.

(b) An effective way to solve the problems described above is to minutely control current and welding time; minutely control electrode force and welding time; or minutely control current, electrode force, and welding time.

(c) In particular, for each of current and electrode force, the time from turning on electricity is independently divided into two stages, where current and/or electrode force at each stage are/is controlled individually. Thus, it is possible to achieve stable formation of fused junctions which are nuggets each having a proper shape.

The present invention is based on the findings described above.

Exemplary embodiments of present invention can be summarized as follows:

1. An indirect spot welding method for welding a member composed of at least two overlapping metal sheets, the method including holding a spot welding electrode against the metal sheets while applying pressure to the spot welding electrode from one side of the member; attaching a feeding point to the metal sheet on the other side of the member at a location remote from the spot welding electrode; and allowing current to flow between the spot welding electrode and the feeding point, wherein the current is kept constant from turning on to turning off electricity; and for electrode force, the time from turning on electricity is divided into two time periods $t_1$ and $t_2$, where electrode force $F_1$ is applied in the first time period $t_1$, and electrode force $F_2$ lower than electrode force $F_1$ is applied in the next time period $t_2$.

2. An indirect spot welding method for welding a member composed of at least two overlapping metal sheets, the method including holding a spot welding electrode against the metal sheets while applying pressure to the spot welding electrode from one side of the member; attaching a feeding point to the metal sheet on the other side of the member at a location remote from the spot welding electrode; and allowing current to flow between the spot welding electrode and the feeding point, wherein electrode force is kept constant from turning on to turning off electricity; and for the current, the time from turning on electricity is divided into two time periods $t_1$ and $t_2$, where current $C_1$ is applied in the first time period $t_1$, and current $C_2$ higher than current $C_1$ is applied in the next time period $t_2$.

3. An indirect spot welding method for welding a member composed of at least two overlapping metal sheets, the method including holding a spot welding electrode against the metal sheets while applying pressure to the spot welding electrode from one side of the member; attaching a feeding point to the metal sheet on the other side of the member at a location remote from the spot welding electrode; and allowing current to flow between the spot welding electrode and the feeding point, wherein for electrode force and the current, the time from turning on electricity is divided into two time periods $t_1$ and $t_2$, where electrode force $F_1$ and current $C_1$ are applied in the first time period $t_1$, and electrode force $F_2$ lower than electrode force $F_1$ and current $C_2$ higher than current $C_1$ are applied in the next time period $t_2$.

4. An indirect spot welding method for welding a member composed of at least two overlapping metal sheets, the method including holding a spot welding electrode against the metal sheets while applying pressure to the spot welding electrode from one side of the member; attaching a feeding point to the metal sheet on the other side of the member at a location remote from the spot welding electrode; and allowing current to flow between the spot welding electrode and the feeding point, wherein for electrode force, the time from turning on electricity is divided into two time periods $t_{F1}$ and $t_{F2}$, where electrode force $F_1$ is applied in the first time period $t_{F1}$, and electrode force $F_2$ lower than electrode force $F_1$ is applied in the next time period $t_{F2}$; and for the current, the time from turning on electricity is divided, independent of time periods $t_{F1}$ and $t_{F2}$, into time periods $t_{C1}$ and $t_{C2}$, where current $C_1$ is applied in the first time period $t_{C1}$ and current $C_2$ higher than current $C_1$ is applied in the next time period $t_{C2}$.

5. The indirect spot welding method according to any one of 1 to 4 described above, wherein an electrode having a curved surface at a head thereof is used as the spot welding electrode.

The present invention makes it possible to stably obtain nuggets formed in a fused state, which has conventionally been seen as difficult to achieve with an indirect spot welding method.

DETAILED DESCRIPTION OF THE INVENTION

Figure 1:
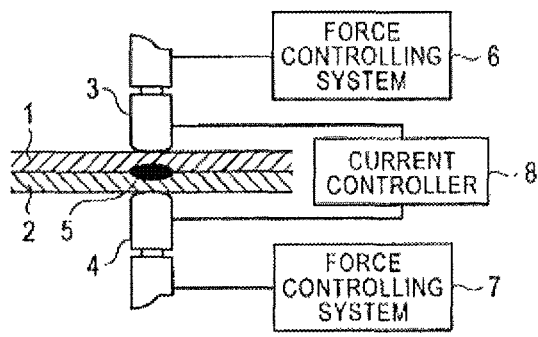
FIG. 1(a) illustrates welding with a direct spot welding method.
FIG. 1(b) illustrates welding with a series spot welding method.
FIG. 1(c) illustrates welding with an indirect spot welding method.
Figure 1:
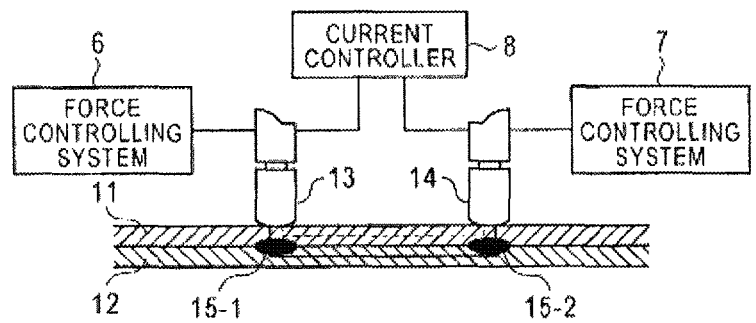
Figure 1:
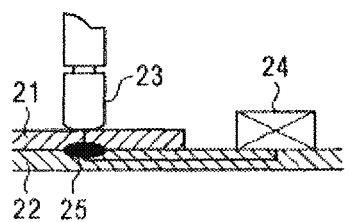

Hereinafter, the present invention will be specifically described with reference to exemplary embodiments selected for illustration in the drawings.

Figure 2:
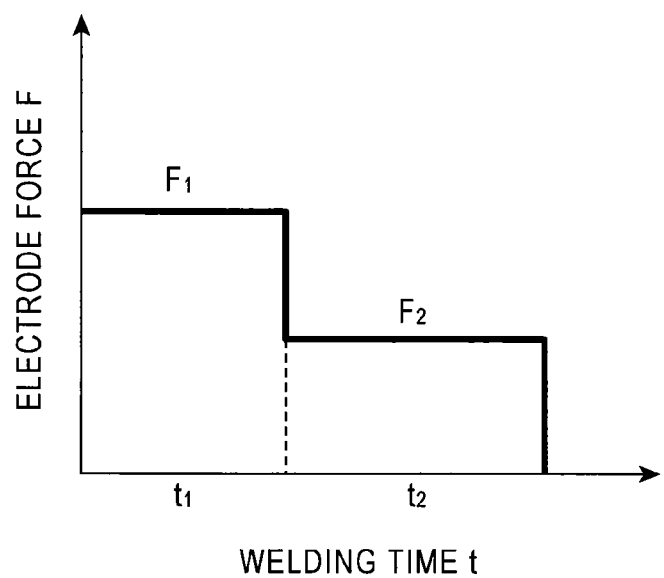
FIG. 2(a) illustrates a basic relationship between welding time and electrode force.
FIG. 2(b) illustrates a basic relationship between welding time and current, both according to exemplary embodiments of the present invention.
Figure 2:
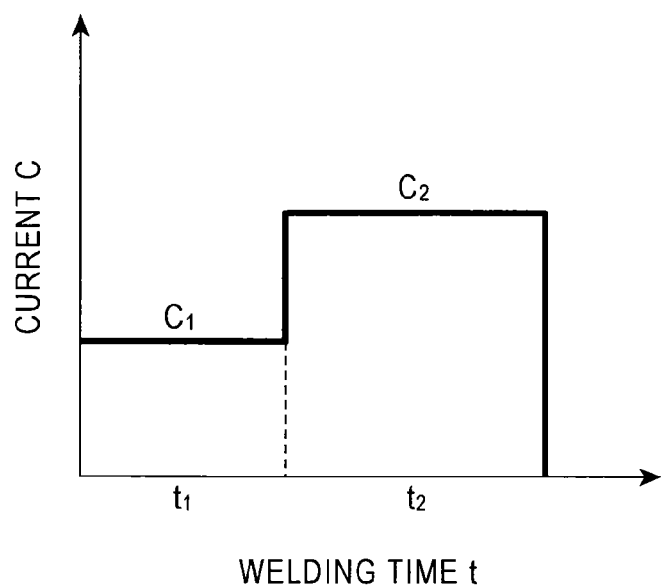

FIG. 2(a) illustrates a basic relationship between welding time and electrode force, and FIG. 2(b) illustrates a basic relationship between welding time and current, both according to embodiments of the present invention.

In an embodiment of the present invention, for electrode force and current, the time from turning on electricity is simultaneously or independently divided into two time periods, in each of which one or both of electrode force F and current C is or are controlled. When one of electrode force F and current C is to be controlled, time periods obtained by dividing the time from turning on electricity are denoted by $t_1$ and $t_2$. When both electrode force F and current C are to be independently controlled, time periods for electrode force F are denoted by $t_{F1}$ and $t_{F2}$ and time periods for current C are denoted by $t_{C1}$ and $t_{C2}$. Electrode forces in the respective time periods are denoted by $F_1$ and $F_2$, and currents in the respective time periods are denoted by $C_1$ and $C_2$.

In exemplary embodiments of the present invention, electrode force $F_1$ and current $C_1$ are applied in time period $t_1$.

Time period $t_1$ is a period of time in which electricity is turned on while an electrode is being held against overlapping metal sheets by applying pressure to the electrode, and formation of a fused portion is started by heat generated by contact resistance between the metal sheets. When indirect spot welding is performed in which the overlapping metal sheets are pressed by the electrode from only one side, with the other side of the metal sheets being unsupported and hollow, electrode force $F_1$ cannot be as high as electrode force applied in the case of direct spot welding where metal sheets are sandwiched by electrodes on both sides. However, if electrode force $F_1$ is too low, since the area of contact between the electrode and the metal sheet in contact therewith becomes extremely small, the current density between the electrode and the metal sheet is increased excessively. This results in fusion and scattering of the metal sheet surface and causes considerable damage to the surface shape. To prevent such a problem, it is beneficial to appropriately select the level of electrode force $F_1$.

Current $C_1$ needs to be high enough to allow fusion to be started by heat generated between the metal sheets. However, extremely high current $C_1$ results in fusion and scattering of the metal sheet surface, such as those described above. This not only causes surface cavities and considerable damage to the appearance, but also causes degradation in joint strength. To prevent such problems, it is beneficial to appropriately select the level of current $C_1$.

Next, in time period $t_2$, electrode force $F_2$ and current $C_2$ are applied. Time period $t_2$ is a stage of further developing the fused portion whose formation has been started in time period $t_1$. When indirect spot welding is performed in a state where the metal sheets are softened around the electrode by heat generated by application of current, with the opposite side of the electrode being unsupported and hollow, the electrode head sinks into the metal sheet in contact therewith due to softening of the metal sheets. This increases the areas of contact and reduces the current densities, between the electrode and the metal sheet and between the metal sheets. As a result, it is not possible to generate heat sufficient to develop a nugget. Therefore, in time period $t_2$, to prevent the electrode head from sinking into the metal sheet, it is preferred to set electrode force $F_2$ to a level lower than electrode force $F_1$.

At the same time, it is preferred to set current $C_2$ to a level higher than current $C_1$. This is because it is beneficial to prevent a decrease in current density resulting from an increase in the areas of contact caused by sinking of the electrode described above. However, extremely high current results in melting and scattering of the fused metal from the metal sheet surface opposite the electrode. This not only causes considerable damage to the appearance, but also causes degradation in joint strength.

In the description above, the time from turning on electricity is divided into two time periods, where electrode force F and current C are controlled simultaneously. However, the present invention is not limited to this. The present invention may be configured such that only one of electrode force and current is controlled, or both electrode force F and current C are controlled independently.

That is, similar effects can be achieved either by the method in which currents $C_1$ and $C_2$ are set to be equal and electrode force $F_2$ is set to be lower than electrode force $F_1$ in time periods $t_1$ and $t_2$, or by the method in which electrode forces $F_1$ and $F_2$ are set to be equal and current $C_2$ is set to be higher than current $C_1$ in time periods $t_1$ and $t_2$.

However, as described above, a more significant effect can be achieved by the method in which electrode force $F_2$ is set to be lower than electrode force $F_1$ and current $C_2$ is set to be higher than current $C_1$ in time periods $t_1$ and $t_2$.

Another possible method is that, for electrode force F, the time from turning on electricity is divided into time periods $t_{F1}$ and $t_{F2}$, where electrode force $F_2$ is set to be lower than electrode force $F_1$, and for current C, the time from turning on electricity is divided, independent of time periods $t_{F1}$ and $t_{F2}$, into time periods $t_{C1}$ and $t_{C2}$, where current $C_2$ is set to be higher than current $C_1$. A more significant effect can be achieved by thus optimally varying the electrode force and current in time periods that are independent of each other.

When the time from turning on electricity is divided into two time periods $t_1$ and $t_2$ and electrode force F and current C are controlled simultaneously, it is preferable that time period $t_1$ be in the range of about 0.02 second to 0.30 second, and time period $t_2$ be in the range of about 0.10 second to 0.60 second. It is also preferable that electrode force $F_1$ in time period $t_1$ be in the range of about 300 N to 2000 N, electrode force $F_2$ in time period $t_2$ be in the range of about 100 N to 1500 N, current $C_1$ in time period $t_1$ be in the range of about 2.0 kA to 10.0 kA, and current $C_2$ in time period $t_2$ be in the range of about 2.5 kA to 12.0 kA.

When currents $C_1$ and $C_2$ are set to be equal and electrode force $F_2$ is set to be lower than electrode force $F_1$ in time periods $t_1$ and $t_2$, it is preferable that the current be in the range of about 2.5 kA to 10 kA. When electrode forces $F_1$ and $F_2$ are set to be equal and current $C_2$ is set to be higher than current $C_1$ in time periods $t_1$ and $t_2$, it is preferable that the electrode force be in the range of about 200 N to 1500 N.

When both electrode force F and current C are controlled independently, it is preferable that, for electrode force F, time period $t_{F1}$ be in the range of about 0.02 second to 0.30 second and time period $t_{F2}$ be in the range of about 0.10 second to 0.60 second, and electrode force $F_1$ in time period $t_{F1}$ be in the range of about 300 N to 2000 N and electrode force $F_2$ in time period $t_{F2}$ be in the range of about 100 N to 1500 N. It is also preferable that, for current C, time period $t_{C1}$ be in the range of about 0.02 second to 0.30 second and time period $t_{C2}$ be in the range of about 0.10 second to 0.60 second, and current $C_1$ in time period $t_{C1}$ be in the range of about 2.0 kA to 10.0 kA and current $C_2$ in time period $t_{C2}$ be in the range of about 2.5 kA to 12.0 kA.

Additionally, in the indirect spot welding, an electrode having a curved surface at its head is preferably used as a spot welding electrode. When the electrode has a curved surface at its head, it is possible, at an early stage during application of current, to ensure a sufficient contact area between the electrode and the metal sheet in contact therewith and prevent an excessive increase in current density. Thus, since the metal sheet surface can be prevented from being fused and scattered, it is possible to avoid considerable damage to the surface shape. Moreover, since necessary and sufficient contact between the metal sheets can be ensured by application of pressure thereto, it is possible to maintain appropriate current density and generate heat sufficient to start fusion. At a later stage during application of current, since the metal sheets are heated and softened, the electrode head sinks into the metal sheet in contact therewith. Since this increases the contact areas and reduces the current densities between the electrode and the metal sheet and between the metal sheets, it may not be possible to generate heat sufficient to develop a fused nugget. However, if the electrode head has a curved surface, a uniform increase in contact area caused by sinking of the electrode head can be avoided.

The curved surface of the electrode head may have a uniform curvature. Alternatively, when a circle centered on the head and having a predetermined radius is used as a boundary, the curved surface of the electrode head may have a larger curvature on one side of the boundary adjacent to the head, and a smaller curvature on the other side of the boundary remote from the head. If the curved surface of the electrode head has a uniform curvature, the curvature radius of the curved surface is preferably in the range of 10 mm to 80 mm. When a circle centered on the head and having a predetermined radius is used as a boundary, if the curved surface of the electrode head has a larger curvature on one side of the boundary adjacent to the head and has a smaller curvature on the other side of the boundary remote from the head, the predetermined radius of the circle centered on the head is preferably in the range of 4 mm to 10 mm, the curvature radius on the side adjacent to the head is preferably in the range of 10 mm to 80 mm, and the curvature radius on the side remote from the head is preferably in the range of 4 mm to 12 mm.

According to one exemplary embodiment, an indirect spot welding method was carried out with the configuration illustrated in FIG. 1(c). In this indirect spot welding method, the metal sheet 21 was an SPC270 steel sheet having a tensile strength of 270 MPa, a sheet thickness of 0.7 mm, and a chemical composition shown in Table 1, and the metal sheet 22 was an SPC270 steel sheet having a sheet thickness of 1.2 mm and the chemical composition shown in Table 1. The indirect spot welding was performed in accordance with patterns of welding time, electrode force, and current shown in Table 2.

The welding involved use of an electrode made of chromium-copper alloy and having a curved surface with a radius of 40 mm at its head, and a direct-current inverter power supply.

In Table 2, Inventive Example 1 presents the case where currents $C_1$ and $C_2$ were set to be equal and electrode force $F_2$ was set to be lower than electrode force $F_1$ in time periods $t_1$ and $t_2$, Inventive Example 2 presents the case where electrode forces $F_1$ and $F_2$ were set to be equal and current $C_2$ was set to be higher than current $C_1$ in time periods $t_1$ and $t_2$, and Inventive Example 3 presents the case where electrode force $F_2$ was set to be lower than electrode force $F_1$ and current $C_2$ was set to be higher than current $C_1$ in time periods $t_1$ and $t_2$. Each of Comparative Examples in Table 2 presents the case where the welding was carried out with the same electrode force and the same current throughout time periods $t_1$ and $t_2$.

Table 3 shows measurements of nugget diameter, nugget thickness, and nugget thickness/diameter of each joint, and also shows observations of occurrence of expulsion in the welding performed in accordance with the patterns shown in Table 2.

In Table 2, the nugget diameter is, in a cross section taken along a center of a welded portion formed between the metal sheets 21 and 22, a length of the welded portion along the mating line between the metal sheets 21 and 22. The nugget thickness is, in a cross section taken along a center of the welded portion, a maximum thickness of the welded portion formed between the metal sheets 21 and 22. The nugget thickness/diameter is obtained by dividing the nugget thickness by the nugget diameter. If the nugget diameter is 4.0 mm or more and the nugget thickness/diameter is 0.35 or more, it is possible to determine that the nugget is a desirable nugget formed in a fused state.

The occurrence of expulsion is disclosed separately as "expulsion between the electrode and sheet" and "expulsion between the sheets".

TABLE 1

| | Chemical Composition | | | | |
|---|---|---|---|---|---|
| | C | Si | Mn | P | S |
| (mass %) | 0.003 | tr | 0.09 | 0.016 | 0.004 |

TABLE 2

| | Upper Row: Welding Time (s) Middle Row: Electrode Force (N) Lower Row: Current (kA) | |
|---|---|---|
| | $t_1$ | $t_2$ |
| Inventive Example 1 | 0.12 1000 7.0 | 0.16 400 |
| Inventive Example 2 | 0.12 400 2.0 | 0.16 7.0 |
| Inventive Example 3 | 0.12 1000 2.0 | 0.16 400 7.0 |
| Comparative Example 1 | 0.28 100 7.0 | |
| Comparative Example 2 | 0.28 400 7.0 | |
| Comparative Example 3 | 0.28 400 9.0 | |

TABLE 2-continued

| | Upper Row: Welding Time (s) Middle Row: Electrode Force (N) Lower Row: Current (kA) | |
|---|---|---|
| | $t_1$ | $t_2$ |
| Comparative Example 4 | 0.28 1000 7.0 | |

TABLE 3

| | Nugget Diameter (mm) | Nugget Thickness (mm) | Nugget Thickness/Diameter | Observed Expulsion |
|---|---|---|---|---|
| Inventive Example 1 | 4.0 | 1.5 | 0.38 | None |
| Inventive Example 2 | 4.1 | 1.6 | 0.39 | None |
| Inventive Example 3 | 4.2 | 1.75 | 0.42 | None |
| Comparative Example 1 | 0 | 0 | — | Expulsion between Electrode and Sheet |
| Comparative Example 2 | 3.8 | 1.0 | 0.26 | None |
| Comparative Example 3 | 4.2 | 1.1 | 0.26 | Expulsion between Sheets |
| Comparative Example 4 | 0 | 0 | — | None |

As shown in Table 3, in each of Inventive Examples 1 to 3, the nugget diameter was 4.0 mm or more and the nugget thickness/diameter was 0.35 or more. In each of these cases, it was possible to obtain a fused nugget having a sufficient nugget diameter and a thickness sufficient for the diameter, and no occurrence of expulsion was observed.

In contrast, there was occurrence of expulsion between the electrode and sheet in Comparative Example 1, and there was occurrence of expulsion between the sheets in Comparative Example 3. Although no expulsion occurred in Comparative Example 2, the nugget diameter was less than 4.0 mm and the nugget thickness/diameter was less than 0.3. Although no expulsion occurred in Comparative Example 4, no fused nugget was able to be obtained.

Figure 3:
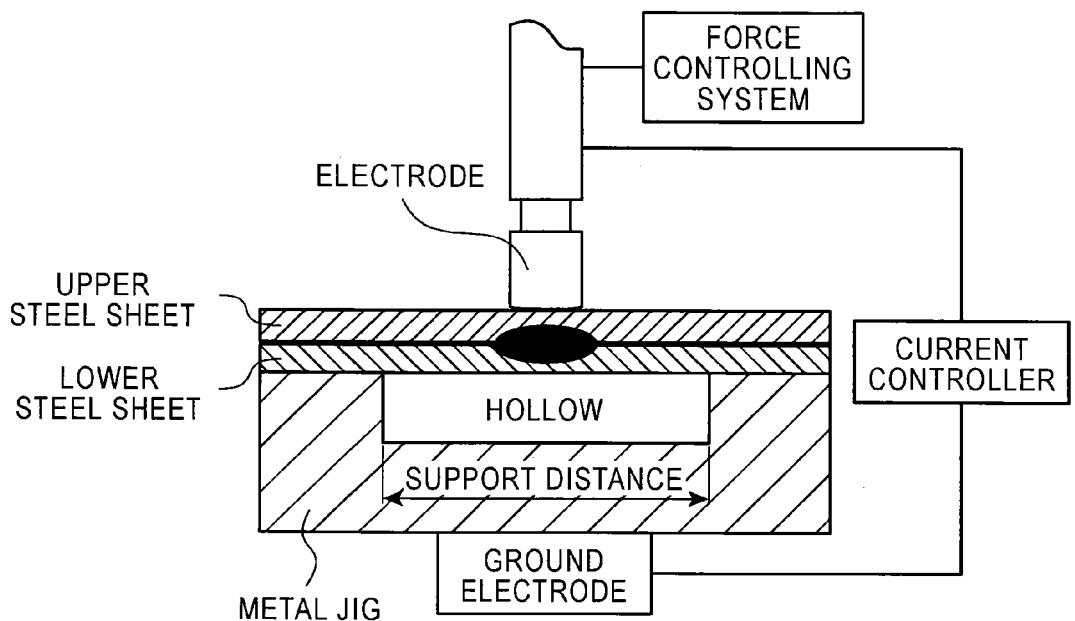
FIG. 3(a) illustrates welding of a first embodiment.
FIG. 3(b) illustrates welding of a second embodiment.
Figure 3:
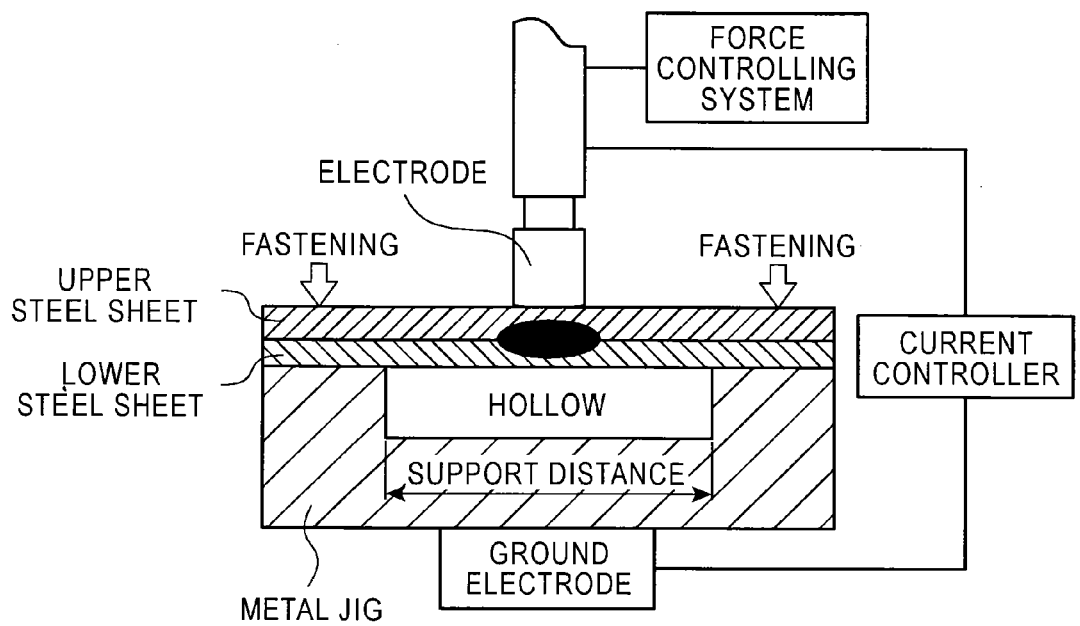

According to another exemplary embodiment, an indirect spot welding method was carried out with a configuration illustrated in FIG. 3(a). An upper steel sheet and a lower steel sheet were placed on a metal jig having a concave portion, such as that illustrated in the drawing. The upper steel sheet was an SPC270 steel sheet having a tensile strength of 270 MPa or more, a sheet thickness of 0.7 mm, and a chemical composition shown in Table 1. The lower steel sheet was an SPC270 steel sheet having a sheet thickness of 1.2 mm and the chemical composition shown in Table 1. A support distance was 30 mm, and a ground electrode was attached to the bottom of the jig. The welding was performed by applying pressure with an electrode from above. Table 4 shows conditions of the time periods from turning on electricity for the electrode force and current, and the electrode force and current in each of the time periods. In all the conditions, the length of time from turning on to turning off electricity was set to 0.28 second.

The welding involved use of an electrode made of chromium-copper alloy and having a curved surface with a radius of 40 mm at its head, and a direct-current inverter power supply.

In Table 4, Inventive Examples 1 and 2 each present the case where current C was kept constant, and for electrode force F, electrode force $F_2$ was set to be lower than electrode force $F_1$ in time periods $t_1$ and $t_2$; Inventive Examples 3 and 4 each present the case where electrode force F was kept constant, and for current C, current $C_2$ was set to be higher than current $C_1$ in time periods $t_1$ and $t_2$; Inventive Examples 5 and 6 each present the case where electrode force $F_2$ was set to be lower than electrode force $F_1$ and current $C_2$ was set to be higher than current $C_1$ in time periods $t_1$ and $t_2$, in which electrode force F and current C were controlled simultaneously; and Inventive Examples 7 and 8 each present the case where, for electrode force F, the time from turning on electricity was divided into time periods $t_{F1}$ and $t_{F2}$ and electrode force $F_2$ was set to be lower than electrode force $F_1$, while for current C, the time from turning on electricity was divided into time periods $t_{C1}$ and $t_{C2}$ independent of time periods $t_{F1}$ and $t_{F2}$ and current $C_2$ was set to be higher than current $C_1$, and both electrode force F and current C were controlled independently.

Also in Table 4, Comparative Examples 1 to 6 each present the case where electrode force F and current C were kept constant from turning on to turning off electricity; Comparative Example 7 presents the case where electrode force $F_2$ was set to be lower than electrode force $F_1$ and current $C_2$ was set to be higher than current $C_1$ in time periods $t_1$ and $t_2$, in which electrode force F and current C were controlled simultaneously; and Comparative Example 8 presents the case where, for electrode force F, the time from turning on electricity was divided into time periods $t_{F1}$ and $t_{F2}$ and electrode force $F_2$ was set to be lower than electrode force $F_1$, while for current C, the time from turning on electricity was divided into time periods $t_{C1}$ and $T_{C2}$ independent of time periods $t_{F1}$ and $t_{F2}$ and current $C_2$ was set to be higher than current $C_1$, and both electrode force F and current C were controlled independently.

Table 5 shows measurements of nugget diameter, nugget thickness, and nugget thickness/diameter of each joint, and also shows observations of defects in appearance in the welding performed in accordance with the patterns shown in Table 4.

In Table 4, as in the case of the first embodiment, the nugget diameter is, in a cross section taken along a center of a welded portion formed between the upper and lower steel sheets, a length of the welded portion along the mating line between the upper and lower steel sheets. The nugget thickness is, in a cross section taken along a center of the welded portion, a maximum thickness of the welded portion formed between the upper and lower steel sheets. The nugget thickness/diameter is obtained by dividing the nugget thickness by the nugget diameter. If the nugget diameter is 3.5 mm or more and the nugget thickness/diameter is 0.25 or more, it is possible to determine that the nugget is a desirable nugget formed in a fused state.

As for defects in appearance caused by fusion and scattering of the welded portion, the occurrence of surface cavities between the electrode and the steel sheet is disclosed.

TABLE 4

| | Upper Row: Time Period (s)/ Electrode Force (N) Lower Row: Time Period (s)/ Current (kA) | |
|---|---|---|
| | First Stage | Second Stage |
| Inventive Example 1 | 0.06/800 0.28/7.0 | 0.22/200 |
| Inventive Example 2 | 0.06/600 0.28/7.0 | 0.22/200 |
| Inventive Example 3 | 0.28/400 0.06/2.0 | 0.22/7.0 |
| Inventive Example 4 | 0.28/400 0.12/2.0 | 0.16/7.0 |
| Inventive Example 5 | 0.06/800 0.06/2.0 | 0.22/200 0.22/7.0 |
| Inventive Example 6 | 0.12/800 0.12/2.0 | 0.16/200 0.16/7.0 |
| Inventive Example 7 | 0.06/800 0.12/2.0 | 0.22/200 0.16/7.0 |
| Inventive Example 8 | 0.12/800 0.06/2.0 | 0.16/200 0.22/7.0 |
| Comparative Example 1 | 0.28/100 0.28/7.0 | |
| Comparative Example 2 | 0.28/200 0.28/7.0 | |
| Comparative Example 3 | 0.28/400 0.28/7.0 | |
| Comparative Example 4 | 0.28/800 0.28/7.0 | |
| Comparative Example 5 | 0.28/400 0.28/2.0 | |
| Comparative Example 6 | 0.28/400 0.28/9.0 | |
| Comparative Example 7 | 0.12/800 0.12/11.0 | 0.16/200 0.16/7.0 |
| Comparative Example 8 | 0.06/800 0.12/11.0 | 0.22/200 0.16/7.0 |

TABLE 5

| | Nugget Diameter (mm) | Nugget Thickness (mm) | Nugget Thickness/Diameter | Defect in Appearance |
|---|---|---|---|---|
| Inventive Example 1 | 3.6 | 0.9 | 0.25 | None |
| Inventive Example 2 | 3.5 | 0.9 | 0.26 | None |
| Inventive Example 3 | 3.7 | 1.0 | 0.27 | None |
| Inventive Example 4 | 3.6 | 1.0 | 0.28 | None |
| Inventive Example 5 | 3.6 | 0.9 | 0.25 | None |
| Inventive Example 6 | 4.0 | 1.1 | 0.28 | None |
| Inventive Example 7 | 3.8 | 1.0 | 0.26 | None |
| Inventive Example 8 | 3.6 | 0.9 | 0.25 | None |
| Comparative Example 1 | 0 | 0 | — | Surface Cavity |
| Comparative Example 2 | 3.1 | 0.7 | 0.23 | None |
| Comparative Example 3 | 3.0 | 0.7 | 0.23 | None |
| Comparative Example 4 | 0 | 0 | — | None |
| Comparative Example 5 | 0 | 0 | — | None |
| Comparative Example 6 | 3.3 | 0.8 | 0.24 | None |
| Comparative Example 7 | 3.0 | 0.7 | 0.23 | None |
| Comparative Example 8 | 3.1 | 0.7 | 0.23 | None |

As shown in Table 5, in each of Inventive Examples 1 to 8, even under intentionally-set conditions where a nugget was not easily formed directly below the electrode, it was possible to obtain a fused nugget having a sufficient nugget diameter and a thickness sufficient for the diameter, and no defect in appearance was observed.

In contrast, there was occurrence of surface cavity in Comparative Example 1. In each of Comparative Examples 2, 3, and 6 to 8, the nugget diameter was less than 3.5 mm and the nugget thickness/diameter was less than 0.25. In the other Comparative Examples, no formation of nugget was observed.

According to yet another exemplary embodiment, an indirect spot welding method was carried out with a configuration illustrated in FIG. 3(b). An upper steel sheet and a lower steel sheet were placed on a metal jig having a concave portion, such as that illustrated in the drawing. The upper steel sheet was an SPC270 steel sheet having a tensile strength of 270 MPa or more, a sheet thickness of 0.7 mm, and the chemical composition shown in Table 1. The lower steel sheet was an SPC270 steel sheet having a sheet thickness of 1.2 mm and the chemical composition shown in Table 1. A support distance was 30 mm, and a ground electrode was attached to the bottom of the jig. The welding was performed by applying pressure with an electrode from above. The overlapping upper and lower steel sheets were brought into close contact with each other by fastening them, at their both ends, with clamps from above the jig. This made shunt current more likely to occur between the steel sheets during application of current. Thus, conditions under which a nugget was not easily formed directly below the electrode were intentionally set. Table 6 shows conditions of the time periods from turning on electricity for the electrode force and current, and the electrode force and current in each of the time periods. In all the conditions, the length of time from turning on to turning off electricity was set to 0.28 second.

The welding involved use of an electrode made of chromium-copper alloy and having a curved surface with a radius of 40 mm at its head, and a direct-current inverter power supply.

In Table 6, Inventive Examples 1 and 2 each present the case where current C was kept constant, and for electrode force F, electrode force $F_2$ was set to be lower than electrode force $F_1$ in time periods $t_1$ and $t_2$; Inventive Examples 3 and 4 each present the case where electrode force F was kept constant, and for current C, current $C_2$ was set to be higher than current $C_1$ in time periods $t_1$ and $t_2$; Inventive Examples 5 and 6 each present the case where electrode force $F_2$ was set to be lower than electrode force $F_1$ and current $C_2$ was set to be higher than current $C_1$ in time periods $t_1$ and $t_2$, in which electrode force F and current C were controlled simultaneously; and Inventive Examples 7 and 8 each present the case where, for electrode force F, the time from turning on electricity was divided into time periods $t_{F1}$ and $t_{F2}$ and electrode force $F_2$ was set to be lower than electrode force $F_1$, while for current C, the time from turning on electricity was divided into time periods $t_{C1}$ and $t_{C2}$ independent of time periods $t_{F1}$ and $t_{F2}$ and current $C_2$ was set to be higher than current $C_1$, and both electrode force F and current C were controlled independently.

Also in Table 6, Comparative Examples 1 to 6 each present the case where electrode force F and current C were kept constant from turning on to turning off electricity; Comparative Example 7 presents the case where electrode force $F_2$ was set to be lower than electrode force $F_1$ and current $C_2$ was set to be higher than current $C_1$ in time periods $t_1$ and $t_2$, in which electrode force F and current C were controlled simultaneously; and Comparative Example 8 presents the case where, for electrode force F, the time from turning on electricity was divided into time periods $t_{F1}$ and $t_{F2}$ and electrode force $F_2$ was set to be lower than electrode force $F_1$, while for current C, the time from turning on electricity was divided into time periods $t_{C1}$ and $t_{C2}$ independent of time periods $t_{F1}$ and $t_{F2}$ and current $C_2$ was set to be higher than current $C_1$, and both electrode force F and current C were controlled independently.

Table 7 shows measurements of nugget diameter, nugget thickness, and nugget thickness/diameter of each joint, and also shows observations of defects in appearance in the welding performed in accordance with the patterns shown in Table 6.

In Table 6, as in the case of the first embodiment, the nugget diameter is, in a cross section taken along a center of a welded portion formed between the upper and lower steel sheets, a length of the welded portion along the mating line between the upper and lower steel sheets. The nugget thickness is, in a cross section taken along a center of the welded portion, a maximum thickness of the welded portion formed between the upper and lower steel sheets. The nugget thickness/diameter is obtained by dividing the nugget thickness by the nugget diameter. If the nugget diameter is 2.5 mm or more and the nugget thickness/diameter is 0.1 or more, it is possible to determine that the nugget is a desirable nugget formed in a fused state.

As for defects in appearance caused by fusion and scattering of the welded portion, the occurrence of surface cavities between the electrode and the steel sheet is disclosed.

TABLE 6

| | Upper Row: Time Period (s)/ Electrode Force (N) Lower Row: Time Period (s)/ Current (kA) | |
|---|---|---|
| | First Stage | Second Stage |
| Inventive Example 1 | 0.06/800 0.28/7.0 | 0.22/200 |
| Inventive Example 2 | 0.06/600 0.28/7.0 | 0.22/200 |
| Inventive Example 3 | 0.06/2.0 | 0.28/400 0.22/7.0 |
| Inventive Example 4 | 0.12/2.0 | 0.28/400 0.16/7.0 |
| Inventive Example 5 | 0.06/800 0.06/2.0 | 0.22/200 0.22/7.0 |
| Inventive Example 6 | 0.12/800 0.12/2.0 | 0.16/200 0.16/7.0 |
| Inventive Example 7 | 0.06/800 0.12/2.0 | 0.22/200 0.16/7.0 |
| Inventive Example 8 | 0.12/800 0.06/2.0 | 0.16/200 0.22/7.0 |
| Comparative Example 1 | | 0.28/100 0.28/7.0 |
| Comparative Example 2 | | 0.28/200 0.28/7.0 |
| Comparative Example 3 | | 0.28/400 0.28/7.0 |
| Comparative Example 4 | | 0.28/800 0.28/7.0 |
| Comparative Example 5 | | 0.28/400 0.28/2.0 |
| Comparative Example 6 | | 0.28/400 0.28/9.0 |
| Comparative Example 7 | 0.12/800 0.12/11.0 | 0.16/200 0.16/7.0 |
| Comparative Example 8 | 0.06/800 0.12/11.0 | 0.22/200 0.16/7.0 |

TABLE 7

| | Nugget Diameter (mm) | Nugget Thickness (mm) | Nugget Thickness/Diameter | Defect in Appearance |
|---|---|---|---|---|
| Inventive Example 1 | 3.1 | 0.4 | 0.13 | None |
| Inventive Example 2 | 2.7 | 0.3 | 0.11 | None |
| Inventive Example 3 | 3.3 | 0.7 | 0.21 | None |
| Inventive Example 4 | 3.3 | 0.7 | 0.21 | None |
| Inventive Example 5 | 3.4 | 0.8 | 0.24 | None |
| Inventive Example 6 | 3.1 | 0.7 | 0.23 | None |
| Inventive Example 7 | 3.8 | 1.0 | 0.26 | None |
| Inventive Example 8 | 4.3 | 0.9 | 0.21 | None |
| Comparative Example 1 | 0 | 0 | — | Surface Cavity |
| Comparative Example 2 | 0 | 0 | — | None |
| Comparative Example 3 | 2.7 | 0.2 | 0.07 | None |
| Comparative Example 4 | 0 | 0 | — | None |
| Comparative Example 5 | 0 | 0 | — | None |
| Comparative Example 6 | 0 | 0 | — | None |
| Comparative Example 7 | 0 | 0 | — | None |
| Comparative Example 8 | 0 | 0 | — | None |

As shown in Table 7, in each of Inventive Examples 1 to 8, even under intentionally-set conditions where a nugget was not easily formed directly below the electrode, it was possible to obtain a fused nugget having a sufficient nugget diameter and a thickness sufficient for the diameter, and no defect in appearance was observed.

In contrast, there was occurrence of surface cavity in Comparative Example 1. Although a nugget diameter of 2.7 mm was achieved in Comparative Example 3, the nugget thickness was not sufficient for the diameter, and the resulting nugget thickness/diameter was less than 0.1. In the other Comparative Examples, no formation of nugget was observed.

According to aspects of the present invention, in indirect spot welding which involves applying pressure to overlapping metal sheets with an electrode from only one side while leaving the other side unsupported and hollow, it is possible to achieve stable formation of fused nuggets each having a sufficient nugget diameter and a thickness sufficient for the diameter.

The invention claimed is:

1. An indirect spot welding method for welding a member composed of at least two overlapping metal sheets, the method comprising:
holding a spot welding electrode against the at least two overlapping metal sheets while applying pressure to the spot welding electrode from one side of the member;
attaching a feeding point to one of the at least two overlapping metal sheets on another side of the member at a location remote from the spot welding electrode;
allowing current to flow between the spot welding electrode and the feeding point;
maintaining a constant electrode force during the indirect spot welding of the member; and
for the current, a duration of the indirect spot welding of the member is divided into two time periods $t_1$ and $t_2$, wherein the method includes applying current set at $C_1$ in a first time period $t_1$, and applying current set at $C_2$ higher than current $C_1$ in a second time period $t_2$.

2. The indirect spot welding method according to claim 1, wherein an electrode having a curved surface at a head thereof is used as the spot welding electrode.

3. An indirect spot welding method for welding a member composed of at least two overlapping metal sheets, the method comprising:
holding a spot welding electrode against the at least two overlapping metal sheets while applying pressure to the spot welding electrode from one side of the member;
attaching a feeding point to one of the at least two overlapping metal sheets on another side of the member at a location remote from the spot welding electrode; and
allowing current to flow between the spot welding electrode and the feeding point;
wherein for electrode force and the current, a duration of the indirect spot welding of the member is divided into two time periods $t_1$ and $t_2$, wherein the method includes applying electrode force set at $F_1$ and current set at $C_1$ in a first time period $t_1$, and applying electrode force set at $F_2$ lower than electrode force $F_1$ and current set at $C_2$ higher than current $C_1$ in a second time period $t_2$.

4. The indirect spot welding method according to claim 3, wherein an electrode having a curved surface at a head thereof is used as the spot welding electrode.

5. An indirect spot welding method for welding a member composed of at least two overlapping metal sheets, the method comprising:
holding a spot welding electrode against the at least two overlapping metal sheets while applying pressure to the spot welding electrode from one side of the member;
attaching a feeding point to one of the at least two overlapping metal sheets on another side of the member at a location remote from the spot welding electrode; and
allowing current to flow between the spot welding electrode and the feeding point:
wherein for electrode force, a duration of the indirect spot welding of the member is divided into two time periods $t_{F1}$ and $t_{F2}$, wherein the method includes applying electrode force set at $F_1$ in a first time period $t_{F1}$, and applying electrode force set at $F_2$ lower than electrode force $F_1$ in a second time period $t_{F2}$; and
for the current, a duration of the indirect spot welding of the member is divided, independent of time periods $t_{F1}$ and $t_{F2}$, into time periods $t_{C1}$ and $t_{C2}$, wherein the method includes applying current set at $C_1$ in a first time period $t_{C1}$, and applying current set at $C_2$ higher than current $C_1$ in a second time period $t_{C2}$.

6. The indirect spot welding method according to claim 5, wherein an electrode having a curved surface at a head thereof is used as the spot welding electrode.

* * * * *